United States Patent Office 3,014,849
Patented Dec. 26, 1961

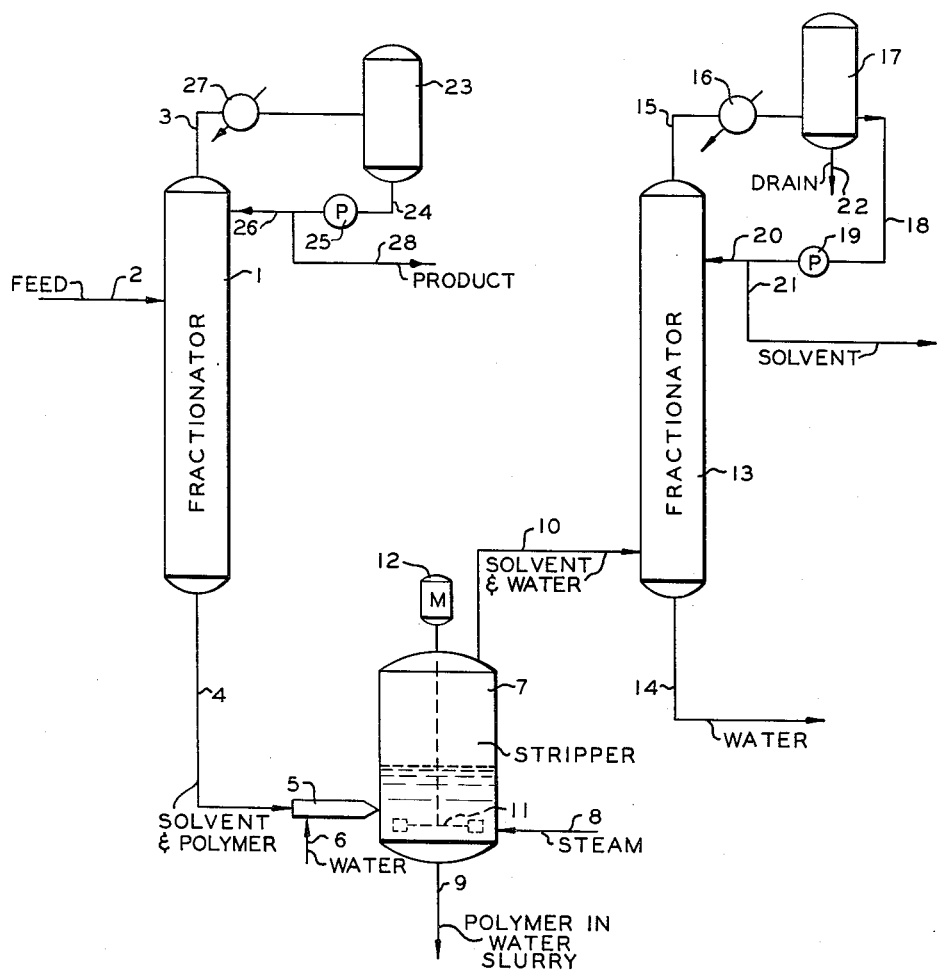

3,014,849
POLYOLEFIN SOLVENT RECOVERY
John E. Cottle, Bartlesville, Okla., assignor to Phillips Petroleum Company, a corporation of Delaware
Filed June 20, 1958, Ser. No. 743,313
5 Claims. (Cl. 202—46)

This application relates to solvent recovery. In one of its aspects, this invention relates to separation of solvent from soluble polymer. In still another aspect, this invention relates to solvent recovery in a process for polymerizing 1-olefins to normally solid polymers.

Polyolefins, particularly polyethylene, have long been used for molding, coating, extruding, and the like, into useful objects such as bowls, pipes, film, fiber, and the like. There are many known processes for polymerizing 1-olefins to obtain solid polymers useful for the cited purposes. Such methods produce solid polymers but the products are not necessarily the same. For example, the polymers produced even from the same olefin can have widely varying densities and crystallinities depending upon the particular polymerization conditions. For example, polymers of ethylene can be produced at very high pressures, e.g., 500 atmospheres and preferably at least 1000 atmospheres at temperatures in the range 100 to 400° C. and preferably in the presence of small amount of oxygen as disclosed by Fawcett et al. in U.S. Patent 2,153,553. Larcher et al., in U.S. 2,816,883, disclose a method of producing polymers of ethylene in the presence of a free radical catalyst at pressures from about 5,000 to 20,000 atmospheres and a temperature above 45° C. and below 200° C. Hogan et al., in U.S. 2,825,721, disclose polymerizing 1-olefins to form solid polymers in the presence of a chromium oxide catalyst. Still other methods of producing solid polymers of 1-olefins include the use of organo-metal catalyst usually in conjunction with a metal halide. In all of these methods an organic solvent or diluent, particularly a hydrocarbon, is preferred or can be used. Also, in the preparation of solid olefin polymers by these methods, a small amount of soluble polymer is formed along with the solid polymer. By soluble polymer, I mean that polymer, usually low molecular weight material, which is soluble in the diluent at room temperature or lower. In these processes, the polymer is frequently recovered from the diluent by cooling the diluent to below the precipitation temperature of the solid polymer either by indirect cooling means or by auto-refrigeration, e.g., evaporation of solvent to cool the solution. In the copending application of Robert G. Wallace, filed February 3, 1958, and having Serial No. 712,908, a method is disclosed and claimed for separating polymer from solvent by admixing the polymer solution with water so as to cause the polymer to precipitate in the water and forming a slurry therein. The resulting water slurry can be separated from the solvent by phase separation or steam stripping. In all of these methods the soluble polymer remains with the solvent. Since these polymer solutions as obtained from polymerization are relatively dilute, the solvent is recovered and recycled to the system. It is frequently desirable that this recycle solvent be free of this soluble polymer.

It is an object of this invention to provide a method of recovering solvent from a polymerization reaction for recycle to the system which is free of impurities.

Another object of this invention is to provide a means of freeing a hydrocarbon of dissolved polymer.

Still other objects, features and advantages of this invention will be obvious to those skilled in the art.

According to this invention, a solvent having polymer dissolved therein is fractionated to provide a polymer free solvent fraction and a solvent fraction enriched in polymer; the polymer enriched fraction is steam stripped to provide a water polymer fraction and an overhead fraction enriched in solvent, the overhead fraction is fractionated to provide a solvent fraction and a water fraction.

As has been indicated, the solvents applicable to this invention are primarily those solvents utilized in polymerizing 1-olefins, however, any solvent containing soluble polymer dissolved therein can be treated by the method of this invention. Generally, the amount of soluble polymers will be less than 0.5 weight percent of the solution, however, the invention is not limited to such percentages.

The solvents most frequently used are hydrocarbons and can be paraffins, cycloparaffins or aromatics. Those skilled in the art and having the cited patents will understand that certain types of solvents are preferred with certain polymerizations, however, this invention is applicable regardless of the solvent and any of the solvents disclosed by the art can be treated by the method of this invention.

This invention can better be described by referring to the accompanying drawing which is a schematic flow block diagram showing the process of this invention.

A stream comprising solvent having soluble polymer dissolved therein passes to fractionator 1 via conduit 2. The fractionator 1 is operated under pressure and temperature conditions so as to obtain an overhead product of polymer free solvent which is removed via conduit 3 through condenser 27 to accumulator 23. A portion of the condensed solvent is recycled to fractionator 1 via conduit 24, pump 25, and conduit 26. The polymer free solvent is withdrawn via conduit 28. The kettle product, solvent and polymer, is removed via conduit 4. The polymer in solvent passes to mixing zone 5 where it is admixed with water supplied via conduit 6. This resulting admixture passes to steam stripping zone 7 where solvent is stripped out by means of steam supplied via conduit 8 leaving polymer dispersed in water. The polymer dispersion is withdrawn via conduit 9 and solvent and water, along with a small amount of polymer passes overhead via conduit 10. The steam stripper can be stirred by means of stirrer 11, driven by motor 12. The water-solvent mixture from conduit 10 passes to fractionator 13 wherein solvent is separated from the water and small amount of polymer, this latter material being removed via conduit 14 and is discarded or sent to water polymer separation as desired. The solvent passes overhead via conduit 15 and condenser 16 to accumulator 17. The solvent is withdrawn from accumulator 17 via conduit 18 and is pumped by means of pump 19 as reflux via conduit 20 or to solvent recycle via conduit 21. The accumulator 17 is provided with drain conduit 22 for removal of any water which may pass overhead.

In the operation of the steam stripper, it is desirable to remove substantially all of the solvent and therefore the stripping conditions are severe. Consequently, some polymer will be carried overhead with the steam and solvent. This polymer can range from low molecular weight completely soluble polymer to high molecular weight tacky polymer. In either case, the polymer is readily removed with the water from fractionator 13.

Those skilled in the art will see many modifications which can be made in the above process. For example, the solvent-polymer mixture in conduit 4 can pass directly to the stripping zone, however, I have found it advantageous to cool this mixture by admixing with water prior to introduction into the stripping zone. This premixing with water minimizes the amount of polymer being carried overhead via conduit 10. The amount of water to be used can vary over wide ranges, e.g., 0.5:1 to 10:1 water to solution ratio and preferably 1:1 to 5:1. The water temperature is preferably low enough to maintain the admixture in liquid phase and will generally be less than 150° F. Valves, pumps and the like, can be supplied by those skilled in the art as needed. The two fractionators are controlled to obtain the desired separation and the pressure and temperature conditions will be dependent upon the particular solvent. In general, the solvent overhead to solvent from bottom will be in the ratio of 5:1 to 10:1 in fractionator 1. The reflux to fractionator 13 will usually be in the range 0.5:1 to 2:1.

*Example*

To illustrate the operation of this invention, a typical separation will be described in conjunction with the drawing. All the flows are given as pounds per stream day.

A stream consisting of 950,000 pounds of cyclohexane and 2,280 pounds of soluble polyethylene obtained from a polymer separation zone is passed via conduit 2 to fractionator 1. This fractionator operates at 50 p.s.i.a., a bottom temperature of 273° F. and an overhead temperature of 263° F. The overhead stream, via conduit 28, consists of 838,300 pounds of cyclohexane. A stream consisting of 111,700 pounds cyclohexane and 2,280 pounds soluble polymer is withdrawn from fractionator 1 via conduit 4 and is passed to mixing zone 5 where it is mixed with 318,000 pounds of 90° F. water to form a dispersion of solvent and polymer in water and having a resulting temperature of 125° F. This material then enters stripper 7 which operates at 18 p.s.i.a. and 185° F. 300 p.s.i.a. saturated steam (63,000 lbs.) enter stripper 7 via conduit 8. A stream consisting of 224 pounds solvent, 2,235 pounds polymer and 363,830 pounds of water is removed via conduit 9. The overhead stream in conduit 10 consists of 111,476 pounds solvent, 45 pounds polymer and 17,170 pounds water or steam and is passed to fractionator 13. This fractionator 13 operates at 16 p.s.i.a., a bottom temperature of 185° F. and a top temperature of 182° F. The column operates with a reflux ratio of 1:1. Solvent is recovered via conduit 21 and consists of 111,459 pounds cyclohexane. The kettle draw off via conduit 14 consists of 17 pounds solvent, 45 pounds polymer and 17,170 pounds water. It can be seen by the operation of this invention, pure solvent is recovered for reuse with a total solvent loss of only 241 pounds of the 950,000 pounds feed or about 0.025 percent.

From the above description and example, it can be seen that the process of this invention offers many advantages. For example, in the operation of stripper 7, soluble polymer passes overhead with solvent and water. If this overhead stream is condensed and separated by phase separation, the polymer, being soluble in the solvent, remains with the solvent and the solvent must be subsequently treated to remove this material. By the method of this invention, the soluble polymer is removed with the water from fractionation column 13. The overhead in conduit 10 in the above example would require the removal of latent heat for condensation, approximately 30,000,000 B.t.u. By the process of this invention, this latent heat is utilized in fractionator 13.

I claim:
1. In a process of polymerizing 1-olefins to solid polymer in the presence of a hydrocarbon diluent and separating solid polymer from said diluent the improvement of recovering said diluent free of soluble polymer formed during the polymerization comprising passing the solvent-polymer solution after being freed of precipitatable solid polymer to a fractionating column wherein the solution is separated into an overhead fraction consisting of solvent essentially free of polymer and a kettle fraction consisting of an enriched polymer solution, admixing the enriched polymer solution with water, steam stripping the enriched polymer solution to take the solvent and water overhead and leaving a polymer-water slurry as kettle product, fractionating the water-solvent overhead into a solvent fraction and a water fraction, and recovering the solvent from each of said fractionations.

2. The improvement of claim 1 wherein a portion of the overhead from the second fractionation is returned to the second fractionation step as reflux.

3. A process for removing low-molecular weight soluble polymer from a hydrocarbon solvent which comprises passing a hydrocarbon solvent having not more than 0.5 weight percent polymer dissolved therein to a first fractionation zone; removing from said first fractionation zone an overhead fraction and a kettle fraction, said overhead fraction to said kettle fraction being in a weight ratio in the range 5:1 to 10:1 so that said overhead fraction is substantially polymer free; admixing the kettle fraction with water under temperature and pressure conditions wherein the water and solvent are in liquid phase; passing the resulting admixture to a steam stripping zone wherein solvent and steam are taken overhead and water and polymer are removed as bottoms; passing the steam and solvent overhead to a second fractionation zone; taking solvent free of water and polymer overhead from said second fractionation zone and water as bottoms from said second fractionation zone; and recovering the polymer free solvent from each of said fractionation zones.

4. The process of claim 3 wherein a portion of overhead from the second fractionation zone is condensed and returned as reflux to said zone at a reflux ratio in the range 0.5:1 to 2:1.

5. The process of claim 4 wherein the polymer is polyethylene and the solvent is cyclohexane.

References Cited in the file of this patent

UNITED STATES PATENTS

| | | |
|---|---|---|
| 2,000,881 | Coleman | May 7, 1935 |
| 2,321,748 | Hopkins et al. | June 15, 1943 |
| 2,386,931 | Carpenter | Oct. 16, 1945 |
| 2,396,600 | Pacevitz | Mar. 12, 1946 |
| 2,556,030 | Coulter | June 5, 1951 |
| 2,607,720 | Elwell et al. | Aug. 19, 1952 |
| 2,614,073 | Harcourt | Oct. 14, 1952 |
| 2,652,439 | Neuhart et al. | Sept. 15, 1953 |
| 2,689,871 | Rathmell et al. | Sept. 21, 1954 |
| 2,825,680 | Stutz | Mar. 4, 1958 |